(12) United States Patent
Matsuoka et al.

(10) Patent No.: US 6,774,514 B2
(45) Date of Patent: Aug. 10, 2004

(54) TOTALLY ENCLOSED TYPE DRIVING ELECTRIC MOTOR

(75) Inventors: Koichi Matsuoka, Tokyo (JP); Minoru Kondo, Tokyo (JP); Yasunari Terada, Yokohama (JP); Takashi Nagayama, Yokohama (JP); Katsuhiko Ibusuki, Musashino (JP); Nobuyuki Yagi, Tokyo (JP); Tsutomu Kinoshita, Hachioji (JP)

(73) Assignees: Kabushiki Kaisha Toshiba, Kawasaki (JP); Railway Technical Research Institute, Tokyo (JP)

( * ) Notice: Subject to any disclaimer, the term of this patent is extended or adjusted under 35 U.S.C. 154(b) by 0 days.

(21) Appl. No.: 09/789,638

(22) Filed: Feb. 22, 2001

(65) Prior Publication Data

US 2001/0017498 A1 Aug. 30, 2001

(30) Foreign Application Priority Data

Feb. 25, 2000 (JP) .................... 2000-049842
Jul. 7, 2000 (JP) .................... 2000-207443

(51) Int. Cl.$^7$ ............... H02K 9/00; H02K 9/06
(52) U.S. Cl. ............... 310/58; 310/52; 310/59; 310/60 R
(58) Field of Search .............. 310/58, 52, 59, 310/61, 63, 64, 89, 40, 62, 60 R, 85, 60 A

(56) References Cited

U.S. PATENT DOCUMENTS

| | | | | |
|---|---|---|---|---|
| 3,748,507 A | * | 7/1973 | Sieber | 310/58 |
| 3,749,953 A | * | 7/1973 | Baumann et al. | 310/62 |
| 3,916,231 A | * | 10/1975 | Cathey | 219/209 |
| 4,186,317 A | * | 1/1980 | Sisk | 310/60 R |
| 4,742,257 A | * | 5/1988 | Carpenter | 310/57 |
| 4,766,337 A | * | 8/1988 | Parkinson et al. | 310/58 |
| 4,807,354 A | * | 2/1989 | Capuano et al. | 29/401.1 |
| 4,908,538 A | * | 3/1990 | Geberth, Jr. | 310/227 |
| 5,327,036 A | * | 7/1994 | Carey | 310/51 |
| 5,650,675 A | * | 7/1997 | Kanaya et al. | 310/51 |
| 5,698,913 A | * | 12/1997 | Yagi et al. | 105/53 |
| 5,789,833 A | * | 8/1998 | Kinoshita et al. | 310/58 |
| 6,160,333 A | * | 12/2000 | Chen et al. | 310/64 |

FOREIGN PATENT DOCUMENTS

| | | | | |
|---|---|---|---|---|
| JP | 355160952 A | * | 4/1979 |
| JP | 355150755 A | * | 11/1980 |
| JP | 362071452 A | * | 4/1987 |
| JP | 405137296 A | * | 11/1991 |
| JP | 406335193 A | * | 12/1994 |
| JP | 407046796 A | * | 2/1995 |
| JP | 9-154254 | | 6/1997 |
| JP | 409154254 A | * | 6/1997 |
| JP | 409154255 A | * | 6/1997 |
| JP | 409205758 A | * | 8/1997 |
| JP | 409205758 A | * | 8/1997 |
| JP | 02000209811 A | * | 1/1999 |

* cited by examiner

*Primary Examiner*—Tran Nguyen
*Assistant Examiner*—Julio C. Gonzalez
(74) *Attorney, Agent, or Firm*—Finnegan, Henderson, Farabow, Garrett & Dunner, L.L.P.

(57) ABSTRACT

The invention relates to a totally enclosed type driving electric motor in which a stator core having a coil is attached to an inner peripheral portion of a frame, a bearing bracket supporting a bearing is attached to one end of the frame, a housing supporting a bearing is attached to another end of the frame, and a shaft of a rotor is rotatably supported by the first bearing and the second bearing. The totally enclosed type driving electric motor of the invention is provided with a cooling space near at least one of the first bearing and the second bearing.

17 Claims, 9 Drawing Sheets

TOTALLY ENCLOSED TYPE DRIVING ELECTRIC MOTOR

CROSS-REFERENCE TO RELATED APPLICATIONS

This application is based upon and claims the benefit of priority from the prior Japanese Patent Applications No. 2000-049842, filed Feb. 25, 2000; and Japanese Patent Application No. 2000-207443, filed Jul. 7, 2000, the entire contents of which are incorporated herein by reference.

BACKGROUND OF THE INVENTION

The present invention relates to a totally enclosed type driving electric motor which is used, for example, in a railway vehicle (particularly, an electric railcar) or the like.

A driving electric motor for a railway vehicle is ventilated and cooled so as to prevent a temperature at a driving time from being increased over a preset value. That is, in the driving electric motor, a cooling wind is taken into an internal portion from an external portion so as to prevent an abnormality in a function of an insulating material and each of members from being generated due to a heat generated by energizing at a time of using the motor, and each of the members within the motor is cooled.

In the general motor, an open air is taken into the motor in accordance with a rotation of a ventilation fan attached to a rotary shaft within the motor. The sucked open air flows through the inner portion of the motor. Accordingly, a heat generating portion is ventilated and cooled.

However, when the open air is taken into the motor so as to perform a cooling operation, dusts contained in the open air are attached to the inner portion of the motor. Accordingly, the inner portion of the driving electric motor is spoiled. In the driving electric motor soiled in the inner portion, a heat radiating efficiency is reduced and a function of the motor is reduced. Therefore, it is necessary to dissemble the driving electric motor at a fixed period so as to take care thereof such as cleaning or the like. Since a lot of labor is required for the cleaning operation, it is required to improve in view of maintenance.

Further, a sound generated by rotation of a ventilating fan for communicating the open air is leaked to an external portion from a port through which the air blows to the external portion from the inner portion of the driving electric motor. The rotation sound of the ventilating fan becomes a large sound in an area having a great number of rotation (in a high speed operation area). Accordingly, it is required to improve the sound.

In order to improve the problems, development of a totally enclosed type driving electric motor has been promoted in recent years. Since the totally enclosed type driving electric motor does not flow the open air into the motor, the inner portion of the motor is not spoiled for a long period. Accordingly, the totally enclosed type driving electric motor is not required to be dissembled, and it is possible to save a maintenance.

Further, since the totally enclosed type driving electric motor does not require a ventilating fan, it is possible to avoid the sound generated by the rotation of the fan, and it is possible to achieve a widely low sound.

FIG. 18 is a cross sectional view showing a first embodiment of a structure of a conventional totally enclosed type driving electric motor. FIG. 18 shows a state in which a rotary axis of a shaft provided in the totally enclosed type driving electric motor is horizontal. FIG. 18 shows an upper half portion of the totally enclosed type driving electric motor in a side cross section parallel to the rotary axis of the shaft, and omits a lower half portion substantially symmetrical to the rotary axis of the shaft.

The conventional totally enclosed type driving electric motor 1 is provided with a frame 2 formed in a cylindrical shape. A cylindrical stator core 3 is mounted to an inner peripheral surface (interior surface) of the frame 2.

A multiplicity of grooves are formed on an inner peripheral surface of the stator core 3 in an axial direction. A stator coil 4 is mounted to the grooves.

A bearing bracket 6 supporting a bearing 5 is provided in one end portion of the frame 2.

A housing 8 supporting a bearing 7 is provided in the other end portion of the frame 2.

The bearing 5 and the bearing 7 rotatably support a shaft 9 of a rotor. The shaft 9 is coaxially provided with the stator core 3.

Further, a lubricating agent such as a lubricating grease or the like for smoothening a rotational operation of the shaft 9 is charged in the bearing 5 and the bearing 7.

A rotor core 10 is provided in a center portion of the shaft 9. A rotor 11 is mounted to a multiplicity of grooves formed on an outer peripheral surface (outer surface) of the rotor core 10.

A rotating force generated in the rotor core 10 is transmitted to a drive apparatus by an end portion 9a of the shaft 9.

A multiplicity of cooling fins 2a and 2b are provided on the outer peripheral surface of the frame 2 and a side surface of the other end portion of the frame 2. The cooling fins 2a and 2b radiate heat generated within the motor to the open air. Further, a multiplicity of cooling fins 6a are also provided on a side surface of the bearing bracket 6.

FIG. 19 is an outer appearance view showing a mounting state of the conventional totally enclosed type driving electric motor 1 structured in the manner mentioned above. FIG. 19 is a view obtained by seeing the totally enclosed type driving electric motor 1 from a direction of the rotary axis of the shaft 9 provided in the totally enclosed type driving electric motor 1 and from a side of the bearing bracket 6.

The totally enclosed type driving electric motor 1 is fixed and supported to a truck frame 12 by supporting arms 2c and 2d provided in a part of the frame 2.

A drive apparatus constituted by a gear (a large gear) 13, a pinion (a small gear) 14 and a gear box 15 is provided in adjacent to the totally enclosed type driving electric motor 1.

A rotating force of the totally enclosed type driving electric motor 1 is transmitted to the pinion 14 by an end portion 9a of the shaft 9, and rotates an axle 16a of a tire wheel 16 through the gear 13 meshed with the pinion 14. Accordingly, a vehicle 17 runs on rails 18.

In the totally enclosed type driving electric motor 1, the heat generated in the stator coil 4 and a rotor bar 11 corresponding to a heat generating portion is discharged to the open air from the frame 2 and the shaft 9 via the stator core 3 and the rotor core 10. Further, in the totally enclosed type driving electric motor 1, the air within the motor is heated by the heat generated in the stator coil 4 and the rotor bar 11. Further, the heat of the air within the motor is transmitted to the frame 2, the bearing bracket 6 and the housing 8 and radiated to the open air. Accordingly, in the conventional totally enclosed type driving electric motor 1, the whole of the apparatus becomes in a heated state.

On the other hand, since a self-ventilation cooling motor is structured such that a cooling wind directly flows through the heat generating portion, the heat in the heat generating portion is discharged to the external portion by the cooling wind at a high rate, so that a temperature of the other portions than the heat generating portions such as the frame, the bearing bracket, the shaft and the like are hard to be increased.

Accordingly, in the conventional totally enclosed type driving electric motor 1, the temperature of the bearing bracket 6, the housing 8, the shaft 9 and the like are widely increased due to the heat within the motor in comparison with the self-ventilation type cooling driving electric motor. Therefore, in the conventional totally enclosed type driving electric motor 1, a lubricating grease is quickly deteriorated due to the heat and the lubricating service life becomes short, so that it is necessary to early replace the grease.

The totally enclosed type driving electric motor 1 is structured such as to save the maintenance by preventing the inner portion of the motor from being spoiled so as to extend a period between the dissembling operations. However, it is a problem that the dissembling operation should be early performed for replacing the lubricating grease of the bearings 5 and 7 as mentioned above.

A description will be given below of another totally enclosed type driving electric motor.

FIG. 20 is a cross sectional view showing a second embodiment of a structure of a conventional totally enclosed type driving electric motor. FIG. 20 is shown in the same state as that of FIG. 18. Further, the same reference numerals are attached to the same elements shown in FIG. 20 as the elements shown in FIG. 18.

The stator core 3 is fitted to the inner peripheral portion of the cylindrical frame 2 provided in a totally enclosed type driving electric motor 19. A multiplicity of grooves are formed in the inner peripheral portion of the stator core 3 in an axial direction. The stator coil 4 is mounted to the grooves.

A bearing bracket (mirror cover) 20 supporting the bearing 5 is provided in one end portion of the frame 2.

The bearing 5 supports the shaft 9 of the rotor. The bearing 5 rotatably supports the rotor. The bearing 5 is formed in a cylindrical shape and the shaft 9 passes through the inner diameter portion.

A side plate 2e is formed in another end portion of the frame 2. Further, the housing 8 supporting the bearing 7 is provided in an inner peripheral portion of the side plate 2e.

A lubricating grease 21 is charged in the bearings 5 and 7 and a periphery thereof. The bearings 5 and 7 are lubricated by the lubricating grease 21. The bearing bracket 20 and an end cover 22 charging the lubricating grease 21 support an outer wheel 5a of the bearing 5 in a fixing state.

In the same manner, the housing 8 and an end cover 23 charging the lubricating grease 21 support an outer wheel 7a of the bearing 7 in a fixing state.

Rotating bodies 5b and 7b are arranged in the bearings 5 and 7 in such a manner as to be in inward contact with the outer wheels 5a and 7a. Inner wheels 5c and 7c of the bearings 5 and 7 are arranged in a state of being in outward contact with the rotating bodies 5b and 7b. Inner peripheral surfaces of the inner wheels 5c and 7c and the shaft 9 are fitted and attached to each other.

Collars 24 to 26 are formed in a cylindrical shape. The shaft 9 passes through inner diameter portions of the collars 24 to 26. The collars 24 to 26 are fitted and attached to the outer peripheral surface of the shaft 9. The collar 24 is arranged so that an outer peripheral surface opposes to the end cover 22. The collar 25 is arranged so that an outer peripheral surface opposes to the bearing bracket 20. The collar 26 is arranged so that an outer peripheral surface opposes to the housing 8.

That is, the inner wheels 5c and 7c and the collars 24 to 26 rotate together with the shaft.

The rotor core 10 is provided in a center portion of the shaft 9. The rotor bar 11 is mounted to a multiplicity of grooves formed on the outer peripheral portion of the rotor core 10. End rings 27a and 27b are connected to both end portions of the rotor bar 11.

A multiplicity of cooling fins 28 for radiating the heat to the open air are provided in an outer portion of the frame 2, the side plate 2e and the bearing bracket 20. The cooling fin 28 efficiently radiates the heat generated from the stator coil 4 or the like.

Further, a fan 29 is mounted to the shaft 9. The structure is made such that the heat within the motor can be exchanged to the open air by a circulating duct 30 in accordance with rotation of the fan 29.

Further, a gear-shaped pressing plate 31 is mounted to the end portion of the shaft 9 in a side of the housing 8. The pressing plate 31 is provided with a cylindrical portion coaxially fitted and attached to the shaft 9 and a gear portion rotating with the same axis as that of the shaft 9.

Then, a sensor 32 for magnetically counting the gears in the pressing plate 31 is mounted to the totally enclosed type driving electric motor 19 so as to oppose to the gear portion of the pressing plate 31.

The pressing plate 31 and a magnetic sensing portion 32a in the sensor 32 are shut from the open air by a sensor case 33 and are protected from the external dusts.

A rotating force generated in the rotor is transmitted to the tire wheel via the drive apparatus from the end portion 9a in a drive side of the shaft 9.

In this conventional totally enclosed type driving electric motor 19, an efficiency of the heat radiation is intended by the cooling fin 28, however, a cooling performance is less than the motor introducing the cooling wind to the inner portion of the motor. Further, since the cooling performance of the totally enclosed type driving electric motor 19 is not sufficient, the lubricating grease 21 is deteriorated due to the heat, and the lubricating service life becomes short, so that it is necessary to early replace the grease and a lot of maintenance labor is required.

Accordingly, it becomes a problem on design how the cooling performance of the totally enclosed type driving electric motors 1 and 19 should be improved.

BRIEF SUMMARY OF THE INVENTION

An object of the present Invention is to provide a totally enclosed type driving electric motor which can restrict a temperature increase of a bearing portion rotatably supporting a shaft, can prevent an early deterioration of a lubricating grease and can extend a period between dissembling operations for maintenance.

A first aspect relates to a totally enclosed type driving electric motor, comprising: a shaft; a frame which has the same axis as that of the shaft; a bearing bracket attached to one end of the frame in an axial direction; a housing attached to another end of the frame; a bearing which rotatably supports the shaft on a sides of said one end of the frame; a bearing support which is located outside a space defined by the frame, the bearing bracket, and the housing, and which supports the bearing; and a rib which couples the bearing bracket to the bearing support, wherein the bearing support is separated from the bearing bracket by the rib and a cooling space communicated with outside air.

In accordance with the first aspect, it is possible to prevent heat generated in the totally enclosed type driving electric motor from being transmitted to the bearing portion. Accordingly, it is possible to restrict a temperature increase of the bearing portion, prevent an early deterioration of a lubricating grease, and extend a non-dissembled period and it is possible to save a maintenance.

In general, in the totally enclosed type driving electric motor, a temperature of the outer wail portion such as the frame, the bearing bracket, the housing and the like becomes high.

However, in the first aspect, the cooling space is provided between the outer wall portion and the portion supporting the bearing.

Accordingly, even when the heat generated from the inner portion of the totally enclosed type driving electric motor is transmitted to the outer wall portion, it is possible to prevent the heat from being transmitted to the portion supporting the bearing at a front thereof. Therefore, in addition to the effect obtained by the structure of the totally enclosed type motor, it is possible to prevent the temperature increase of the bearing portion.

In the first aspect, the cooling space is formed in an annular (cylindrical) shape having the same axis as that of the shaft.

In the first aspect, it is possible to prevent the heat from being transmitted from all the directions toward the portion supporting the bearing from the bearing bracket and the housing. Further, it is possible to radiate the heat transmitted to the portion supporting the bearing from the shaft.

A second aspect is a totally enclosed type driving electric motor of the same type as that of the first aspect mentioned above. In this second aspect, the rib is provided with a cooling fin.

It is possible to further improve the cooling effect by providing the cooling fin in the rib, as in the second aspect.

A third aspect to further improve the cooling effect by providing the cooling fin in the rib, as in the second aspect.

A third aspect is a totally enclosed type driving electric motor of the same type as that of the first aspect mentioned above. In this third aspect, a collar is located between the bearing bracket and the shaft, a space between the bearing support and the collar forms a first labyrinth, and a space between the bearing bracket and the collar forms a second labyrinth.

A fourth aspect is a totally enclosed type driving electric motor of the same type as that of the first aspect mentioned above. In this fourth aspect, a collar is located on a surface of the shaft, a space between the bearing support and the collar forms a first labyrinth, a cap is located between the bearing bracket and the collar, and a space between the collar and the cap forms a second labyrinth.

In this fourth aspect, even if that the water or the like enters the cooling space together with the open air, it is possible to prevent the water or the like from entering the motor via the labyrinth by a groove. Accordingly, it is possible to extend the non-dissembled period and it is possible to save the maintenance.

In the fourth aspect, since the totally enclosed type driving electric motor can be constructed by machining the portion near the groove and thereafter assembling each of the portions, it is possible to easily machine the totally enclosed type driving electric motor.

A fifth aspect is a totally enclosed type driving electric motor of the same type as that of the first aspect. In this fifth aspect, a guide wind path which guides outside air from the outside into the cooling space between the bearing bracket and the bearing support is provided.

In this fifth aspect, since the open air is positively guided to the cooling space by the guide wind path, it is possible further improve the cooling effect.

A sixth aspect is a totally enclosed type driving electric motor, comprising: a shaft; a frame which has the same axis as that of the shaft, which is formed in a cylindrical shape, and which surrounds the shaft: a bearing bracket attached to one end of the frame in an axial direction; a housing attached to another end of the frame; a bearing which rotatably supports the shaft on a side of said another end of the frame; a bearing support which is located outside a space defined by the frame, the bearing bracket, and the housing, and which supports the bearing; and a rib which couples the housing to the bearing support, wherein the bearing support is separated from the housing by the rib and a cooling space communicated with outside air.

A seventh aspect is a totally enclosed type driving electric motor of the same type as that of the sixth aspect. In this seventh aspect, the rib is provided with a cooling fin.

An eighth aspect is a totally enclosed type driving electric motor of the same type as that of the sixth aspect. In this eighth aspect, a collar is located between said housing and the, shaft, a space between the bearing support and said collar forms a first labyrinth, and a space between said housing and the collar forms a second labyrinth.

A ninth aspect is a totally enclosed type driving electric motor of the same type as that of the sixth aspect. In this ninth aspect, a collar is located on a surface of the shaft, a space between the bearing support and the collar forms a first labyrinth, a cap is located between said housing and the collar, a space between the collar and the cap forms a second labyrinth, a groove is formed in the bearing support near the first labyrinth, and a groove is formed in the cap near the second labyrinth.

A tenth aspect is a totally enclosed type driving electric motor of the same type as that of the sixth aspect. In this tenth aspect, a guide wind path which guides outside air from the outside into the cooling space between the housing and the bearing is provided.

The sixth to tenth aspects mentioned above correspond to the aspects obtained by applying the structures of the bearing bracket side of the first to fifth aspects mentioned above to the structure of the housing. Accordingly, the sixth to tenth aspects can obtain the same effects due to the same operations as those of the first to fifth aspects.

An eleventh aspect is a totally enclosed type driving electric motor, comprising: a shaft; a frame which has the same axis as that of the shaft, which is formed in a cylindrical shape, and which surrounds the shaft a bearing bracket attached to one end of the frame in an axial direction; a housing attached to another end of the frame; a bearing which is supported by the bearing bracket and which rotatably supports the shaft; a collar which is located on a surface of the shaft, outside a space defined by the frame, the bearing bracket, and the housing, which is in contact with the bearing; and a fan which is connected to the collar, which rotates in accordance with a rotation of the collar, and which radiates heat transmitted from the bearing through the collar to outside air.

In the eleventh aspect, the fan is provided in a portion being in contact with the open air of the collar which is arranged near the bearing and rotates on the basis of the rotation of the shaft.

In this eleventh aspect, it is possible to prevent the heat generated in the inner portion of the totally enclosed type driving electric motor from being transmitted to the bearing portion via the various kinds of constituting members, whereby the temperature of the bearing is increased. Further, it is possible to prevent the air within the totally enclosed type driving electric motor from being heated, whereby the temperature of the bearing is increased.

Accordingly, it is possible to improve a cooling performance of the bearing portion and it is possible to restrict a temperature increase of the totally enclosed type driving electric motor. In particular, it is possible to prevent the lubricating grease from being early deteriorated so as to extend a non-dissembled period, and it is possible to provide an effective structure of the bearing portion in the totally enclosed type driving electric motor which can save on maintenance.

As mentioned above, since the fan is provided in the collar, it is possible to generate the cooling wand due to the rotation of the fan, and it is possible to radiate the heat from the fan, so that it is possible to realize a further effective cooling operation of the totally enclosed type driving electric motor.

A twelfth aspect is totally a enclosed type driving electric motor of the same type as that of the eleventh aspect. In this twelfth aspect, the fan generates a wind by rotating in accordance with the rotation of the collar, and the wind cools a part of the bearing bracket near the bearing.

As mentioned above, a further effective cooling operation of the totally enclosed type driving electric motor can be realized by bringing the wind generated due to the rotation of the fan into contact with a part of the bearing bracket near the bearing.

A thirteenth aspect is a totally enclosed type driving electric motor of the same type as that of the eleventh aspect mentioned above. In this thirteenth aspect, a cooling fin is connected to a part of the bearing bracket that receives wind.

As mentioned above, a further effective cooling operation of the totally enclosed type driving electric motor can be realized by providing the fin in the portion receiving the wind.

A fourteenth aspect is a totally enclosed type driving electric motor of the same type as that of the eleventh aspect mentioned above. In this fourteenth aspect, the fan is a disc portion concentric with the shaft, and a groove is formed in the surface of the disc portion.

As mentioned above, by forming the portion being in contact with the open air in the collar in a disc shape, it is possible to expand the area of the portion being in contact with the open air. Further, by providing the groove on the circular surface of the disc-like portion, it is possible to expand the area of the portion being in contact with the open air.

Accordingly, it is possible to realize a further effective cooling operation of the totally enclosed type driving electric, motor, and in particular, it is possible to effectively cool the portion near the bearing.

A fifteenth aspect is a totally enclosed type driving electric motor, comprising: a shaft; a frame which has the same axis as that of the shaft, which is formed in a cylindrical shape, and which surrounds the shaft a bearing bracket attached to one end of the frame in an axial direction: a housing attached to another end of the frame; a bearing which is supported by the housing and which rotatably supports the shaft; a pressing plate which is connected to the shaft, outside a space defined by the frame, the bearing bracket, and the housing, and which is in contact with the bearing; and a fan which is connected to a pressing plate, which rotates in accordance with a rotation of the pressing plate, and which radiates heat transmitted from the bearing through the pressing plate to outside air.

In this fifteenth aspect, the fan is connected to a portion in contact with the open air of the pressing plate which is arranged near the bearing and rotates based on the rotation of the shaft.

In this fifteenth aspect, it is possible to prevent the heat generated in the inner portion of the totally enclosed type driving electric motor from being transmitted to the bearing portion via the various kinds of constituting members, whereby the temperature of the bearing is increased. Further, it is possible to prevent the air within the totally enclosed type driving electric motor from being heated, whereby the temperature of the bearing is increased.

Accordingly, it is possible to improve a cooling performance of the bearing portion and it is possible to restrict a temperature increase of the totally enclosed type driving electric motor. In particular, it is possible to prevent the lubricating grease from being prematurely deteriorated so as to extend an operational period, and it is possible to provide an effective structure of the bearing portion in the totally enclosed type driving electric motor that can reduce maintenance.

As mentioned above, since the fan is connected to at east one of the collar and the pressing plate, it is possible to generate the cooling wind due to the rotation of the fan, and it is possible to radiate the heat from the fan, so that it is possible to realize a further effective cooling operation of the totally enclosed type driving electric motor.

A sixteenth aspect is a totally enclosed type driving electric motor of the same type as that of the fifteenth aspect. In this sixteenth aspect, the fan generates a wind by rotating in accordance with the rotation of the pressing plate, and the wind cools at least one of said another end of the frame and the housing.

A seventeenth aspect is a totally enclosed type driving electric motor of the same type as that of the fifteenth aspect. In this seventeenth aspect, a cooling fin is connected to a part of at least one of said another end of the frame and the housing that receives the wind.

As mentioned above, a further effective cooling operation of the totally enclosed type driving electric motor can be realized by providing the fin in the portion receiving the wind.

In this case, the first to seventeenth aspects mentioned above can be freely combined with each other so as to be applied. For example, it is possible to apply to the totally enclosed type driving electric motor by combining the cooling space in accordance with the first aspect mentioned above with the fan in accordance with the eleventh aspect mentioned above.

Additional objects and advantages of the invention will be set forth in the description which follows, and in part will be obvious from the description, or may be learned by practice of the invention. The objects and advantages of the invention may be realized and obtained by means of the instrumentalities end combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
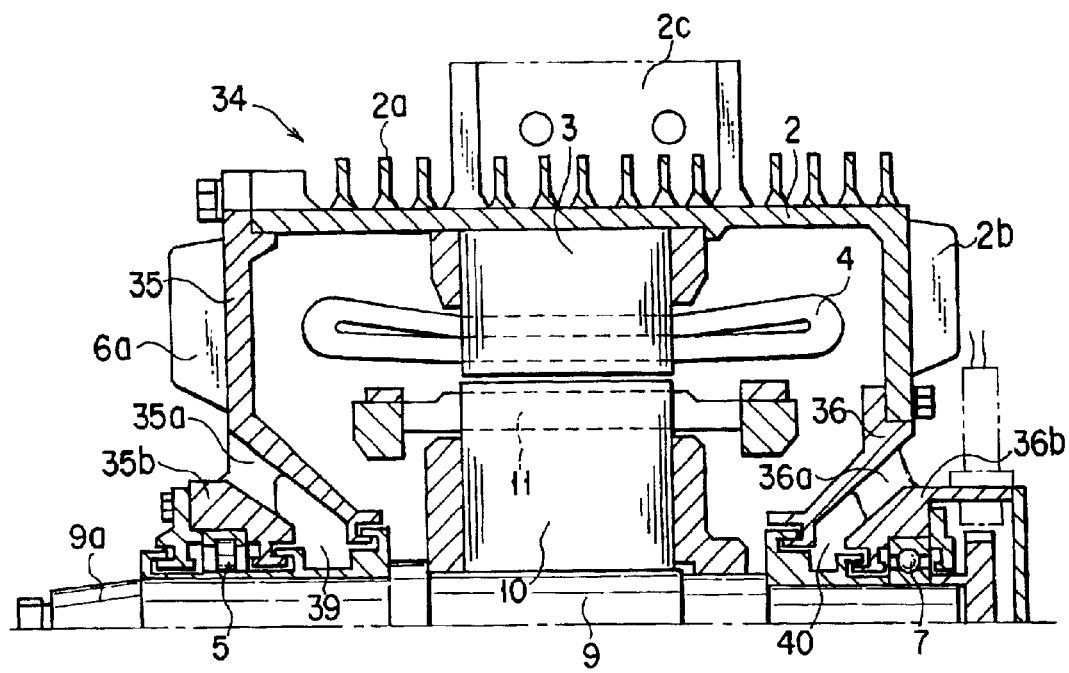
FIG. 1 is a cross sectional view showing a structure of a totally enclosed type driving electric motor in accordance with a first embodiment of the present invention.

A description will be given below of each of embodiments with reference to the accompanying drawings. In the following description, the same reference numerals are attached to the same elements and a description thereof will be omitted or briefly given.

First Embodiment

In the present embodiment, a description will be given of a totally enclosed type driving electric motor in which an annular (cylindrical) cooling space is provided near a bearing.

Figure 18:
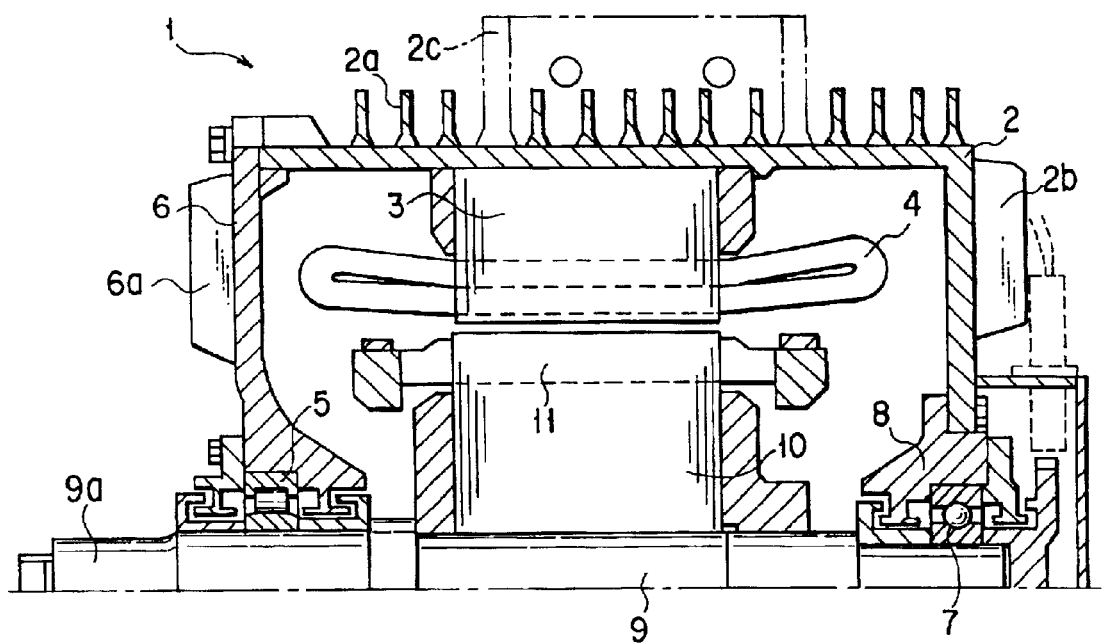
FIG. 18 is a cross sectional view showing a first example of a structure of a conventional totally enclosed type driving electric motor.

FIG. 1 is a cross sectional view showing a structure of a totally enclosed type driving electric motor in accordance with the present embodiment. FIG. 1 is illustrated in the same state as that of FIGS. 18 and 20.

A stator core 3 is provided in an inner peripheral side of a frame 2 in a totally enclosed type driving electric motor 34. A stator coil 4 is received in a groove provided in an inner peripheral side of the stator core 3.

A bearing bracket 35 is supported to one end of the frame 2. A housing 36 is supported to the other end of the frame 2.

A multiplicity of cooling fins 2a and 2b are provided in an outer peripheral portion of the frame 2. A multiplicity of cooling fins 6a are also provided in the bearing bracket 35.

A rotor core 10 is fixed to a center portion within the motor of a shaft 9 supported by bearings 5 and 7. A rotor bar 11 is mounted to an outer peripheral portion of the rotor core 10. One end 9a of the shaft 9 is connected to a drive apparatus.

The bearing bracket 35 is formed in a circular shape (this can be said to be annular since the shaft 9 extends through a center portion). The bearing bracket 35 is arranged in one end of the frame 2 so as to have the same axis as that of the shaft 9. The bearing bracket 35 is mainly constituted by an outer diameter portion, an inner diameter portion, and a rib 35a connecting the outer diameter portion to the inner diameter portion.

An inner diameter portion (a center portion) of the bearing bracket 35 constitutes a bearing support portion 35b connected to the outer diameter portion via a plurality of ribs 35a. The bearing 5 provided in the bearing support portion 35b rotatably supports the shaft 9 in the manner mentioned above.

The housing 36 is formed in a circular shape (an annular shape) in the same manner as that of the bearing bracket 35, and is arranged in another end of the frame 2 so as to have the same axis as that of the shaft 9. A bearing support portion 36b connected to an outer diameter portion via a plurality of ribs 36a is formed in an inner diameter portion of the housing 36. The bearing 7 provided in the bearing support portion 36b rotatably supports the shaft 9.

Figure 2:
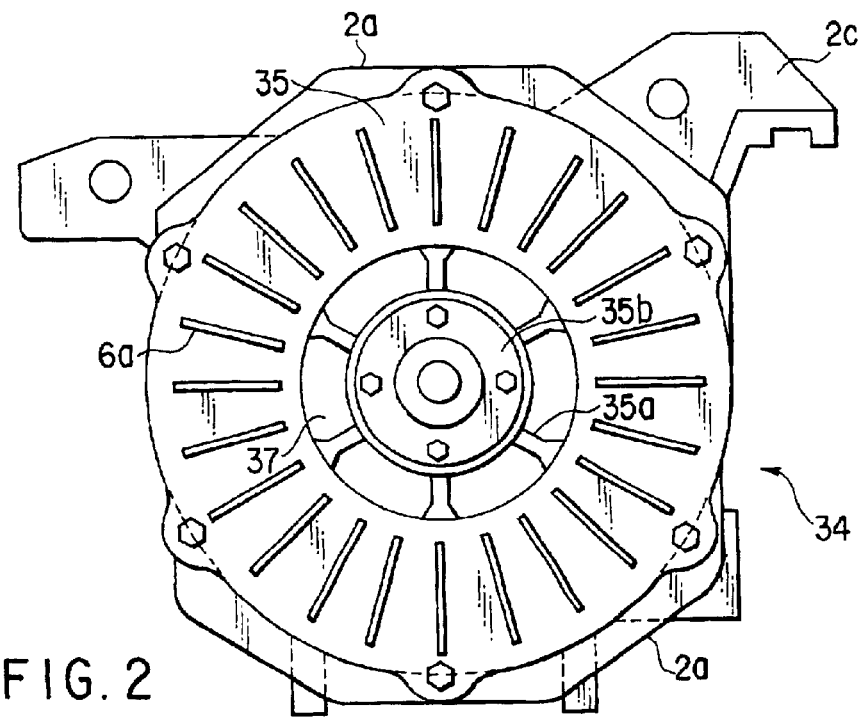
FIG. 2 is an outer appearance view obtained by seeing the totally enclosed type driving electric motor in accordance with the first embodiment from a bearing bracket 20 side.

FIG. 2 is an outer appearance view obtained by seeing the totally enclosed type driving electric motor 34 in accordance with the present embodiment from the bearing bracket 35 side. Further, FIG. 2 shows a case of seeing from a rotary axis of the shaft 9.

A space surrounded by an inner peripheral side of the outer diameter portion of the bearing bracket 35, an outer peripheral side of the bearing support portion 35b corresponding to the inner diameter portion of the bearing bracket 35, and the rib 35a connecting the outer diameter portion to the bearing support portion 35b (a space between the ribs 35a) constitutes a communicating port 37.

Figure 3:
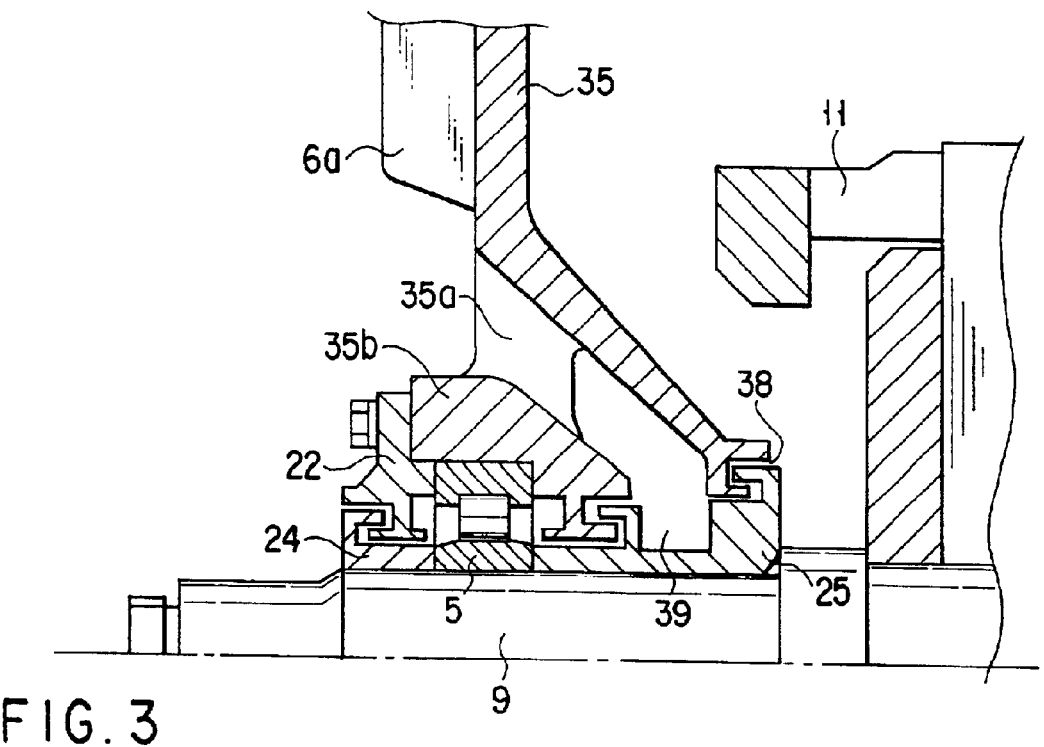
FIG. 3 is a cross sectional view obtained by enlarging a portion near a bearing of the totally enclosed type driving electric motor in accordance with the first embodiment.

FIG. 3 is a cross sectional view obtained by enlarging a portion near the bearing 5 of the totally enclosed type driving electric motor 34 shown in FIG. 1 mentioned above.

The bearing 5 is fixed in a longitudinal direction (in a direction of a rotary axis of the shaft 9) by an end cover 22 and collars 24 and 25. A lubricating grease 21 is charged in a space portion within the bearing 5 and on a side surface of the bearing 5.

An end portion in an inner peripheral side of the outer diameter portion of the bearing bracket 35 and in an inner side of the motor is extended to an inner diameter side (a shaft 9 side). A labyrinth 38 formed by a fine gap is formed in the inner peripheral side of the outer diameter portion of this extended bearing bracket 35 and between the end portion in the inner side of the motor and the collar 25.

An annular space 39 having the same axis as that of the shaft 9 is formed between the space within the motor surrounded by the frame 2, the bearing bracket 35 and the housing 36 and the bearing support portion 35b.

The annular space 39 is communicated with the open air outside the motor by a communicating port 37 formed between the ribs 35a. In this case, a state being communicated with the open air corresponds to a state in which the open air can enter.

On the other hand, even in the side of the housing 36, in the same manner as that of the bearing bracket 35 side, an annular space 40 is formed between the space within the motor and the bearing support portion 36b.

A description will be given below of a cooling operation of the totally enclosed type driving electric motor 34 having the structure mentioned above.

A heat generated from the stator coil 4 within the totally enclosed type driving electric motor 34 is transmitted to the frame 2, the outer diameter portion of the bearing bracket 35 and the outer diameter portion of the housing 36 via the stator core 3. Further, the heat generated from the stator coil 4 and the rotor bar 11 is transmitted to the frame 2, the outer diameter portion of the bearing bracket 35 and the outer diameter portion of the housing 36 via the air within the motor.

The heat transmitted to the frame 2, the outer diameter portion of the bearing bracket 35 and the outer diameter portion of the housing 36 is effectively discharged to the open air by the frame 2, the surface of the bearing bracket 35 and the cooling fins 2a, 2b and 6a, so that a temperature of heat generating portion can be restricted.

The heat increasing the temperature of the outer diameter portion of the bearing bracket 35 and the outer diameter portion of the housing 36 is transmitted to the bearing support portions 35b and 36b via the ribs 35a and 36a, however, since the open air directly flows (naturally flows) within the annular spaces 39 and 40, the ribs 35a and 36a are cooled by the open air.

Accordingly, the heat transmission to the bearing support portions 35b and 36b from the inner portion side of the motor is restricted by the annular spaces 39 and 40, and the temperature increase of the bearings 5 and 7 is restricted, so that it is possible to prevent the lubricating grease 21 from being thermally deteriorated.

As mentioned above, in the totally enclosed type driving electric motor 34, the bearing support portions 35b and 36b supporting the bearings 5 and 7 and charging the lubricating grease 21 are constituted in the inner diameter portion of the bearing bracket 35 and the inner diameter portion of the housing 36 which form the outer wall.

Here, in the present embodiment, the bearing support portion 35b of the bearing bracket 35 fixed to the frame 2 and the outer diameter portion of the bearing bracket 35 are supported by a plurality of ribs 35a. In the same manner, the bearing support portion 36b of the housing 36 fixed to the frame 2 and the outer diameter portion of the housing 36 are supported by a plurality of ribs 36a.

Further, the annular spaces 39 and 40 around the rotary axis of the shaft 9 are formed between the bearing support portions 35b and 36b and the space within the motor. That is, the annular spaces 39 and 40 exist among the outer diameter portion of the bearing bracket 35, the outer diameter portion of the housing 36 (a boundary portion sectioning the space within the motor and the space outside the motor) and the bearing support portions 35b and 36b. The open air is communicated with the annular spaces 39 and 40 by the communicating port 37 formed between the ribs 35a and 36a.

Accordingly, in the totally enclosed type driving electric motor 34 in accordance with the present embodiment, since the open air is always communicated with the annular spaces 39 and 40, the heat transmitted from the air in the frame 2 and the inner portion of the motor to the outer diameter portion of the bearing bracket 35 and the outer diameter portion of the housing 36 is cooled during the transmission to the bearing support portions 35b and 36b via the ribs 35a and 36a.

Accordingly, it is possible to restrict the temperature increase of the bearing support portions 35b and 36b provided with the bearings 5 and 7. Further, since the heat transmitted to the bearing support portions 35b and 36b from the shaft 9 is cooled by the annular spaces 39 and 40, the temperature increased can be restricted.

Therefore, it is possible to prevent the lubricating grease 21 from being early deteriorated, it is possible to extend a non-dissembled period and it is possible to save a maintenance.

Second Embodiment

A description will be given of a modified embodiment of the totally enclosed type driving electric motor in accordance with the first embodiment described above.

Figure 4:
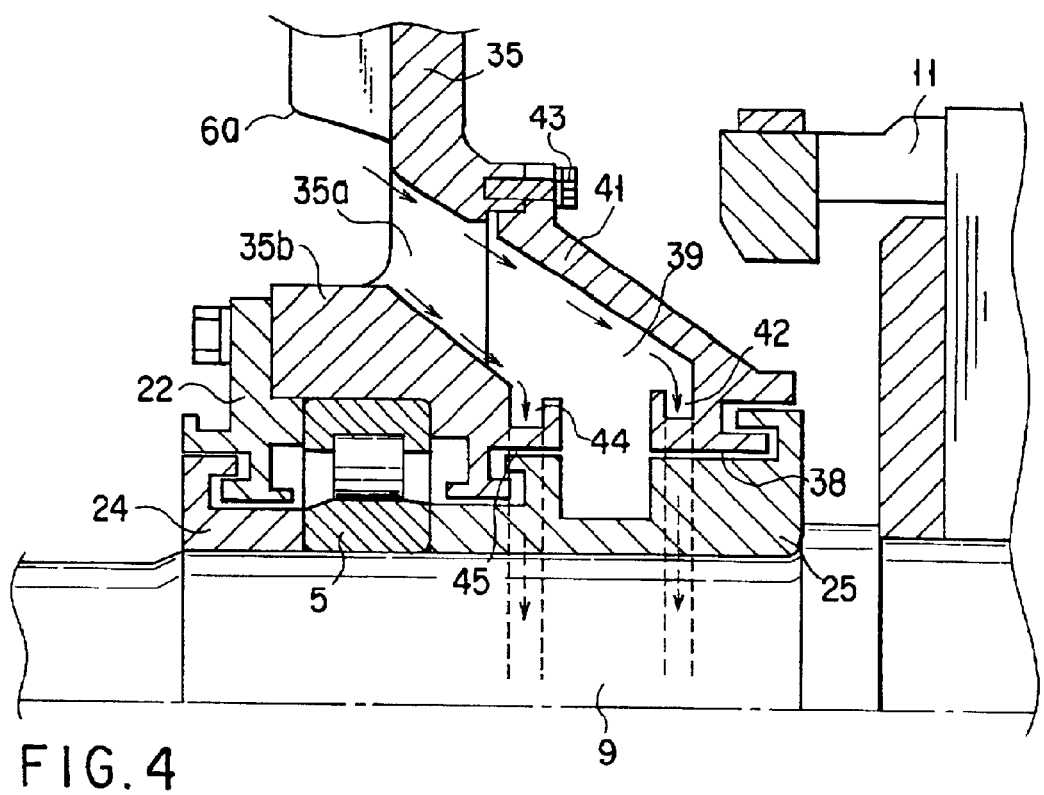
FIG. 4 is a cross sectional view showing a portion near a bearing of a totally enclosed type driving electric motor in accordance with a second embodiment of the present invention.

FIG. 4 is a cross sectional view showing a portion near the bearing 5 of a totally enclosed type driving electric motor in accordance with the present embodiment. FIG. 4 is illustrated in the same manner as that of FIG. 3.

The totally enclosed type driving electric motor in accordance with the present embodiment is structured such that a portion between the bearing bracket 35 and the collar 25 is connected by a cap 41. Further, the totally enclosed type driving electric motor is structured such that a groove 42 is provided on a surface of the cap 41 in a side of the annular space 39 for the purpose of preventing the water or the like from entering into the inner portion. The groove 42 is open to the outer peripheral side within the annular space 39.

In the bearing bracket 35 formed in a circular shape, the bearing support portion 35b connected to the outer diameter portion by a plurality of ribs 35a is supported. The bearing support portion 35b supports the bearing 5.

The portion in an inner peripheral side in the outer diameter portion of the bearing bracket 35 and in an inner side of the motor is fixed to the outer peripheral end portion of the annular cap 41 by a bolt 43.

The cap 41 becomes an element forming the annular space 39 between the space within the motor and the bearing support portion 35b. The annular space 39 s communicated with the open air by the communicating port between the ribs 35a.

The inner peripheral side of the cap 41 constitutes a labyrinth 38 together with the collar 25.

A groove 44 open to the outer peripheral side is formed in the bearing support portion 35b of the bearing bracket 35, within the annular space 39.

The bearing support portion 35b constitutes a labyrinth 45 between the bearing support portion 35b and the collar 25, in an inner peripheral side of the groove 44.

In the totally enclosed type driving electric motor in accordance with the present embodiment, the same structure as that mentioned above may be realized in the housing 36 side.

In the totally enclosed type driving electric motor in accordance with the present embodiment having the structure mentioned above, in the case that the water enters into the annular space 39 from the external portion of the motor, the water moving along the wall is collected within the grooves 42 and 44, moves around a lower portion, and thereafter is discharged out of the motor.

Accordingly, it is possible to prevent the water from entering within the fine gap in the labyrinths 38 and 45, and it is possible to prevent the water from entering within the bearing 5 and the motor.

Since a train motor is mounted in a truck under the floor, there is a case that the water or the snow is sputtered to the motor at a time of running. However, in the totally enclosed type driving electric motor in accordance with the present embodiment, it is possible to prevent the water from entering within the motor and the bearings 5 and 7 even in this case.

Accordingly, it is possible to extend a non-dissembled period and save the maintenance.

Further, in the totally enclosed type driving electric motor in accordance with the present embodiment, since the structure is made such that the bearing bracket 35 and the cap 41 can be separated, it is possible to easily machine the grooves 42 and 44 or the like in accordance with a machining operation.

Third Embodiment

In the present embodiment, a description will be given below of a modified embodiment of the totally enclosed type driving electric motor in accordance with the first or second embodiment described above. In this case, a description will be given of a totally enclosed type driving electric motor in which a cooling efficiency is improved by forming the ribs in a thin plate shape.

Figure 5:
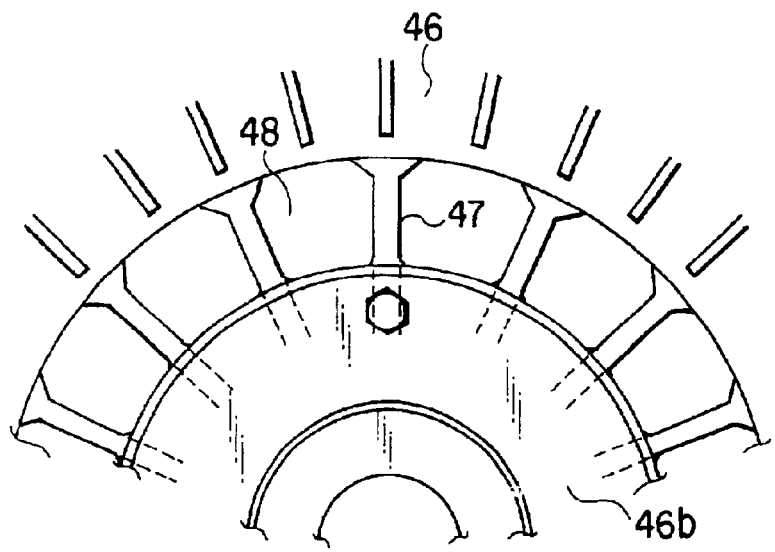
FIG. 5 is an outer appearance view obtained by enlarging a portion near a rib of a totally enclosed type driving electric motor in accordance with a third embodiment of the present invention.

FIG. 5 is an outer appearance view obtained by enlarging a portion near the rib of the totally enclosed type driving electric motor in accordance with the present embodiment. FIG. 5 is illustrated in the same state as that of FIG. 2.

In the totally enclosed type driving electric motor in accordance with the present embodiment, an outer diameter portion of a bearing bracket 46 and a bearing support portion 46b corresponding to an inner diameter portion of the bearing bracket 46 are supported by a multiplicity of thin ribs 47.

A portion between the ribs 47 forms a communicating port 48 communicating the open air with the annular space.

By providing a multiplicity of thin ribs 47 as in the manner of the present embodiment, it is possible to increase a total area of the ribs 47 being in contact with the open air, and it is possible to further improve a cooling performance.

Accordingly, it is possible to restrict a heat transmission to the bearing support portion 46b and it is possible to further prevent the temperature increase of the bearing.

Therefore, it is possible to prevent the lubricating grease 21 from being early deteriorated, it is possible to extend a non-dissembled period, and it is possible to save the maintenance.

Fourth Embodiment

In the present embodiment, a description will be given of a modified embodiment of the totally enclosed type driving electric motor in accordance with the first to third embodiments described above. In this case, a description will be given of a totally enclosed type driving electric motor in which the cooling fin is provided in the rib.

Figure 6:
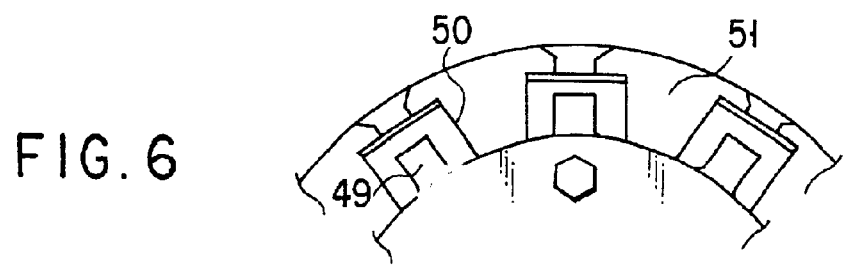
FIG. 6 is an outer appearance view obtained by enlarging a portion near a rib of a totally enclosed type driving electric motor in accordance with a fourth embodiment of the present invention.

FIG. 6 is an outer appearance view obtained by enlarging a portion near the rib of the totally enclosed type driving electric motor in accordance with the present embodiment. FIG. 6 is illustrated in the same state as that of FIG. 5.

In the totally enclosed type driving electric motor in accordance with the present embodiment, a plate-like cooling fin 50 substantially perpendicular to a longitudinal direction of a rib 49 is provided in the rib 49. A portion between the ribs 49 forms a communicating port 51.

Figure 7:
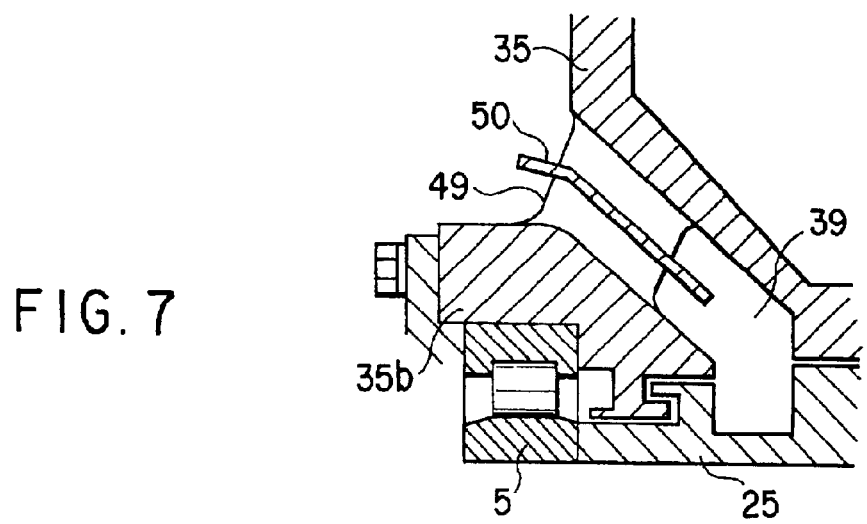
FIG. 7 is a cross sectional view showing the portion near the rib of the totally enclosed type driving electric motor in accordance with the fourth embodiment.

FIG. 7 is a cross sectional view showing a portion near the rib 49 of the totally enclosed type driving electric motor in accordance with the present embodiment. FIG. 7 is illustrated in the same state as that of FIG. 3 mentioned above.

The cooling fin 50 is integrally provided in the rib 49 supporting the bearing support portion 35b corresponding to the inner diameter portion of the bearing bracket 35.

The heat transmitted to the bearing support portion 35b from the bearing bracket 35 via the rib 49 is effectively radiated to the open air by the cooling fin 50. Accordingly, the heat transmitted to the bearing support portion 35b is further reduced and it is possible to further restrict the temperature increase of the bearing.

Fifth Embodiment

In the present embodiment, a description will be given of a modified embodiment of the totally enclosed type driving electric motor in accordance with the first to fourth embodiments described above. In this case, a description will be given of a totally enclosed type driving electric motor in which a guide wind path for introducing a running wind into an annular space is provided in an outer side of the motor in the bearing support portion.

Figure 8:
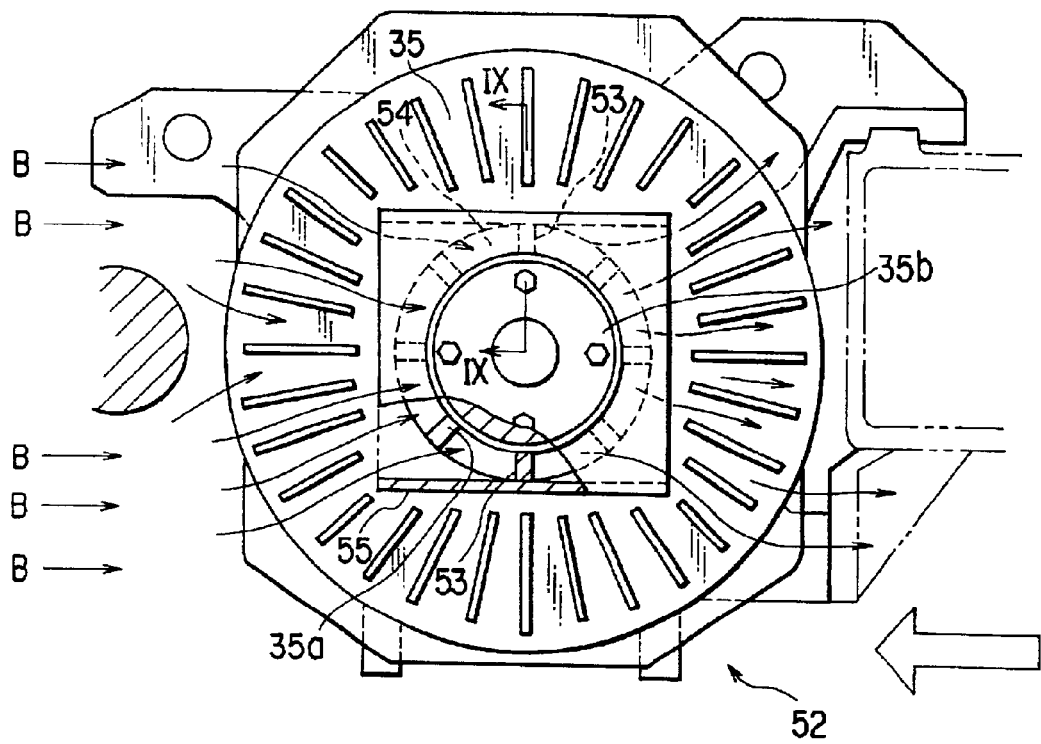
FIG. 8 is an outer appearance view obtained by seeing a totally enclosed type driving electric motor in accordance with a fifth embodiment of the present invention from a bearing bracket side.

FIG. 8 is an outer appearance view obtained by seeing a totally enclosed type driving electric motor in accordance with the present embodiment from a side of the bearing bracket 35. FIG. 8 is illustrated in the same state as that of FIG. 2 described above.

Figure 9:
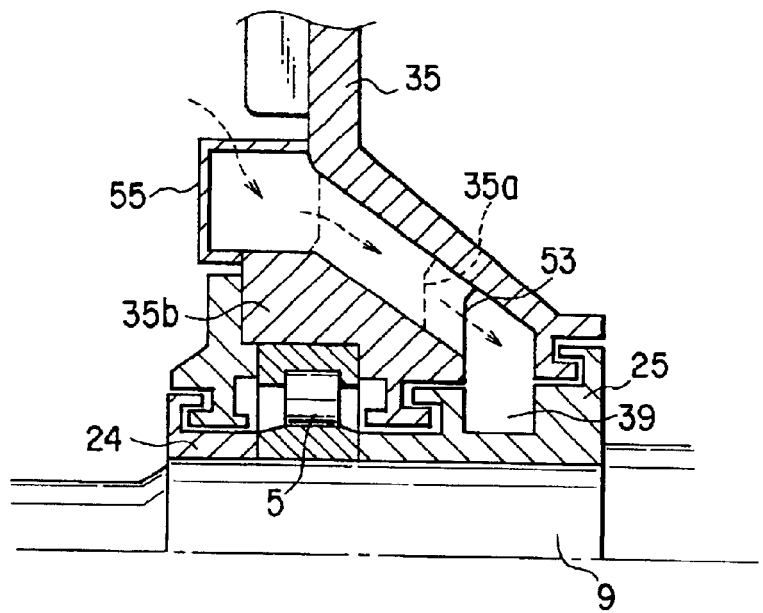
FIG. 9 is a cross sectional view showing a portion near a bearing of the totally enclosed type driving electric motor in accordance with the fifth embodiment.

Further, FIG. 9 is a cross sectional view showing a portion near the bearing 5 of the totally enclosed type driving electric motor in accordance with the present embodiment. FIG. 9 is illustrated in the same manner as that of FIG. 3 described above.

In a totally enclosed type driving electric motor 52, the bearing support portion 35b is supported to the inner peripheral side of the outer diameter portion of the bearing bracket 35 via the rib 35a and a partition rib 53. Further, the annular space 39 is formed between the inner portion of the motor and the bearing 5.

Figure 19:
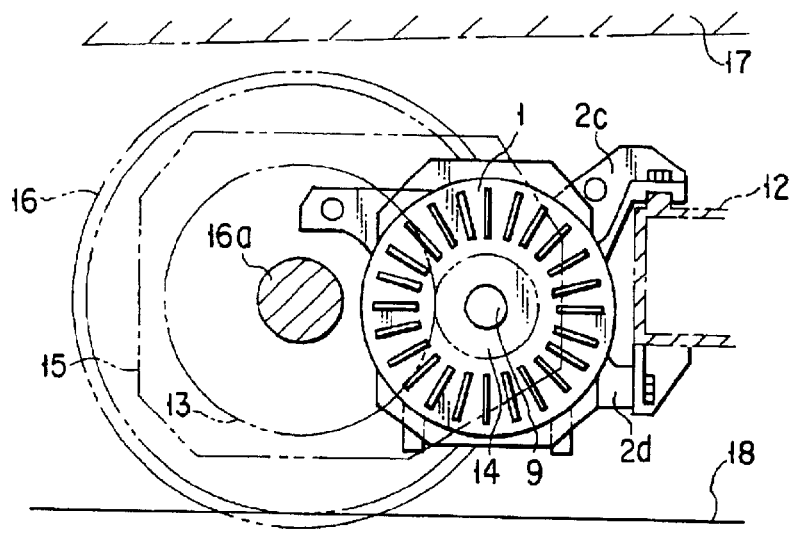
FIG. 19 is an outer appearance view showing a mounting state of the conventional totally enclosed type driving electric motor 1.

The totally enclosed type driving electric motor 52 is provided in a railway vehicle in the same manner as that of the conventional totally enclosed type driving electric motor 1 shown in FIG. 19 described above.

As shown in FIG. 8, when the railway vehicle provided with the totally enclosed type driving electric motor 52 runs in a leftward direction A, the totally enclosed type driving electric motor 52 receives a running wind in an opposite direction B (a rightward direction) to the running direction A.

The annular space 39 is communicated with the open air by a communicating port 54 formed between the ribs 35a or the partition ribs 53.

A guide wind path 55 covering the communicating port 54 of the bearing bracket 35 is provided in the totally enclosed type driving electric motor 52.

As shown in FIG. 8, the guide wind path 55 is open in a side receiving the running wind. The partition ribs 53 arranged in upper and lower portions at a center protrude into the wind path, and partition the guide wind path 53 into a running wind receiving side and a discharging side (that is, right and left portions).

A description will be given below of an operation of the totally enclosed type driving electric motor 52 having the structure mentioned above.

The running wind flows into the guide wind path 55 in accordance with the forward movement of the vehicle. The inflow running wind is positively flowed into the annular space 39 from the communicating port 54 in the forward moving side by the partition rib 53 protruding within the guide wind path 55.

Further, the running wind flowing into the annular space 39 is discharged from the communicating port 54 in the discharge side to the guide wind path 55 and is discharged out of the motor.

As mentioned above, in the totally enclosed type driving electric motor 52, the running wind at a time of operating the vehicle is positively flowed into the annular space 39. Accordingly, a cooling effect can be further improved and it is possible to further restrict the temperature increase of the bearing 5.

Therefore, it is possible to prevent the lubricating grease 21 from being early deteriorated, it is possible to extend a non-dissembled period, and it is possible to save the maintenance.

The structure of positively taking the wind into the cooling space as mentioned above may be applied to the housing side in addition to the bearing bracket side.

In this case, in each of the embodiments, the description is given of the example in which the outer wall portion sectioning the internal air and the external air of the totally enclosed type driving electric motor is constituted by the frame, the outer diameter portion of the bearing bracket and the housing, however, the structure is not limited to this. For example, even when all the outer wall portions are constituted by the frame, the same operations and effects can be obtained by employing the same structure (the cooling space is provided between the outer wall portion and the bearing support portion).

Further, in each of the embodiments mentioned above, the bearing bracket is integrally constituted by the outer diameter portion, the rib, and the bearing support portion, however, the outer diameter portion, the rib and the bearing support portion may be constituted by separated structures. The housing may be constituted by separated structures of the outer diameter portion, the rib and the bearing support portion, in the same manner.

Sixth Embodiment

In the present embodiment, a description will be given of a totally enclosed type driving electric motor provided with a fan in a portion of the collar being in contact with the open air.

Figure 10:
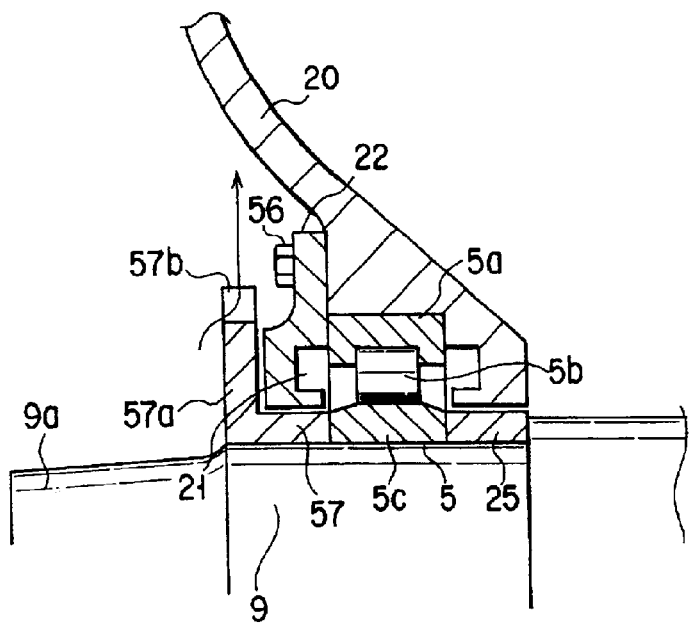
FIG. 10 is a cross sectional view exemplifying a structure around a collar being in contact with an open air in a bearing bracket side among a totally enclosed type driving electric motor in accordance with a sixth embodiment of the present invention.

FIG. 10 is a cross sectional view exemplifying a structure around the collar being in contact with the open air in the bearing bracket side (the drive side), among a totally enclosed type driving electric motor in accordance with the present embodiment. FIG. 10 is illustrated in the same state as that of FIG. 3 described above.

Figure 20:
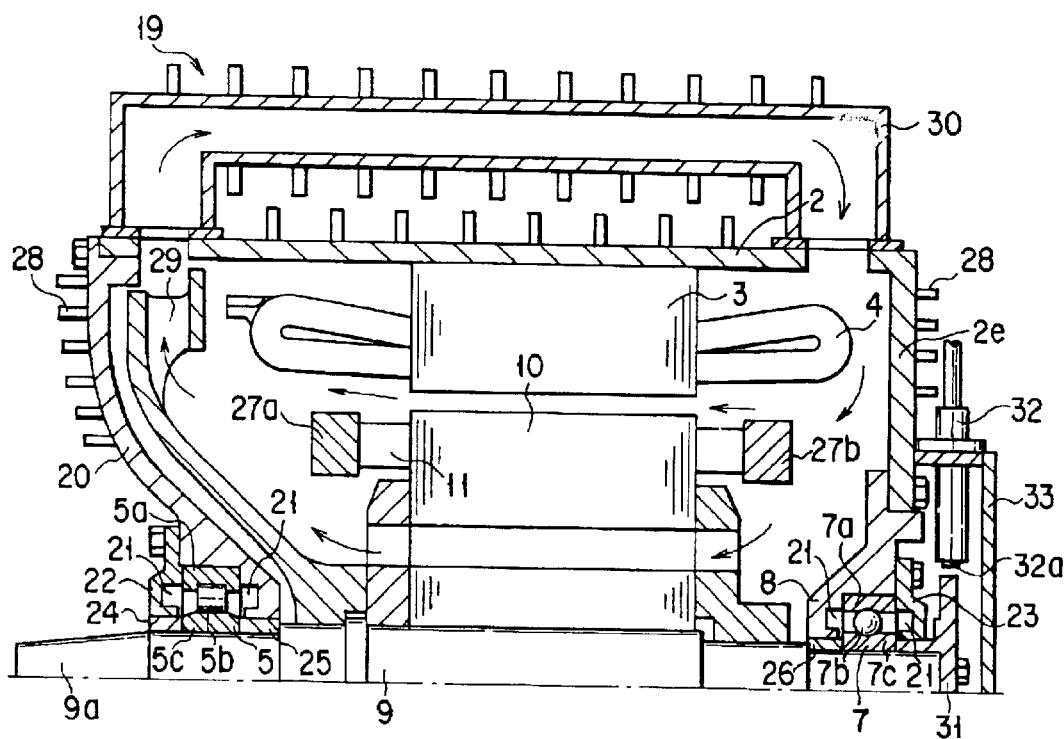
FIG. 20 is a cross sectional view showing a second example of the structure of the conventional totally enclosed type driving electric motor.

In this case, with respect to the portions which are not shown in FIG. 10, the same structure as that of the totally enclosed type driving electric motor 19 shown in FIG. 20 may be, for example, employed.

The bearing 5 is constituted by an outer wheel 5a fitted to a center axial portion of the bearing bracket 20 in an inner contact manner, an inner wheel 5c fitted to the outer peripheral portion of the shaft 9 in an outer contact manner, and a plurality of rotating bodies 5b rotating between the outer wheel 5a and the inner wheel 5c. The shaft 9 is rotatably supported by the bearing 5.

Further, the outer wheel 5a of the bearing 5 is fixed in an axial direction by the end cover 22 and bearing bracket 20. The end cover 22 is fixed to the bearing bracket 20 by a bolt 56.

The lubricating grease 21 circulating through the bearing 5 is charged in the annular space portion opposing to the side surface of the bearing 5 in the bearing bracket 20 and the end cover 22. Collars 57 and 25 are arranged so as to oppose to the inner peripheral side of the center portion of the bearing bracket 20 and the end cover 22. The collars 57 and 25 are fitted and attached onto the outer periphery of the shaft 9.

An outer peripheral portion of a portion being in contact with the open air in the collar 57 is extended in a radial direction so as to form a disc portion 57a. Further, a multiplicity of grooves 57b for operating the disc portion 57a as a fan are worked on the outer peripheral portion of the disc portion 57a.

Further, in the totally enclosed type driving electric motor in accordance with the present embodiment, a part of the bearing bracket 20 is positioned on an extending line in a radial direction of the multiplicity of groove 57b portions.

Figure 11:
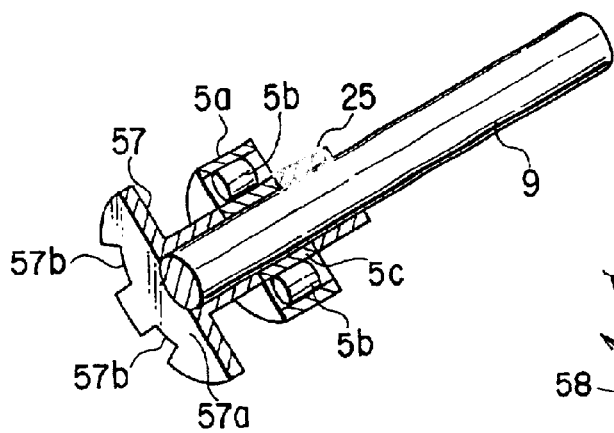
FIG. 11 is a perspective cross sectional view exemplifying a relation among a bearing, a collar and a shaft in the totally enclosed type driving electric motor in accordance with the sixth embodiment.

FIG. 11 is a perspective cross sectional view exemplifying a relation among the bearing 5, the collars 57 and 25 and the shaft 9 in the totally enclosed type driving electric motor in accordance with the present embodiment.

The disc portion 57a of the collar having the fan structure rotates on the basis of the rotation of the shaft 9.

In the totally enclosed type driving electric motor in accordance with the present embodiment, since the heat of the bearing 5 is radiated to the open air due to the fan operation of the disc portion 57a of the collar 57 integrally rotating with the shaft 9 of the rotor, it is possible to restrict the temperature increase of the lubricating grease 21.

Further, the bearing bracket 6 is cooled by the wind (shown by an arrow in FIG. 1) generated in accordance with the fan operation of the disc portion 57a so as to be radially discharged, so that the bearing 5 and the lubricating grease 21 are cooled.

As mentioned above, in the totally enclosed type driving electric motor in accordance with the present embodiment, the collar 57 fitted to the rotating shaft 9 rotates at a time of using the motor, the groove 57b is provided on the outer periphery of the collar 57 so as to form the fan, and the heat transmitted from the bearing 5 being in contact with the collar 57 is effectively radiated to the open air via the main body of the collar 57.

Further, the wind radially blowing out in the radial direction and generated due to the fan effect of the collar 57 is brought into contact with the bearing bracket 20 on the extending line in the radial direction. Then, the bearing bracket 20 is cooled by the wind, so that the bearing 5 and the lubricating grease 21 which are in contact with the bearing bracket 20 are cooled.

Accordingly, it is possible to improve the cooling performance of the bearing portion in the totally enclosed type driving electric motor, and it is possible to restrict the temperature increase of the totally enclosed type driving electric motor. In particular, since the portion near the bearing 5 can be cooled, it is possible to increase a lubricating service life of the lubricating grease 21 and it is possible to maintenance labor for replacement or the like.

In this case, in the present embodiment, the description is given of the case that the wind generated due to the fan effect of the disc portion 57a is brought into contact with the bearing bracket 20, however, the structure may be made such that the wind is brought into contact with the end cover 22 and the frame 2.

Further, in the present embodiment, an unevenness may be provided in the portion receiving the wind generated due to the fan operation. Accordingly, it is possible to increase the area of the portion receiving the wind and it is possible to further improve the cooling effect.

Seventh Embodiment

In the present embodiment, a description will be given of a modified embodiment of the totally enclosed type driving electric motor in accordance with the sixth embodiment mentioned above.

Figure 12:
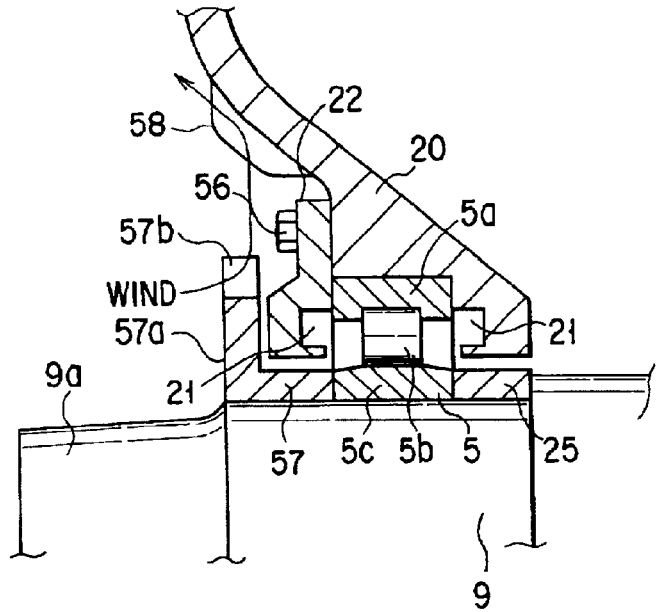
FIG. 12 is a cross sectional view exemplifying a structure around a collar arranged in a bearing bracket side and being in contact with the open air, among a totally enclosed type driving electric motor in accordance with a seventh embodiment of the present invention.

FIG. 12 is a cross sectional view exemplifying a peripheral structure of a collar arranged in the bearing bracket side and being contact with the open air, among a totally enclosed type driving electric motor in accordance with the present embodiment. FIG. 12 is illustrated in the same manner as that of FIG. 10 described above.

In the totally enclosed type driving electric motor in accordance with the present embodiment, a multiplicity of fins 58 are provided in a part of the bearing bracket 20 and on an extending line in a radial direction of the disc portion 57a of the collar 57.

The wind radially blowing out in the radial direction and generated due to the fan effect by the disc portion 57a of the collar 57 is brought into contact with the cooling fin 58 of the bearing bracket 20 arranged on the extending line in the radial direction. The bearing bracket 20 is cooled by the wind, so that the bearing 5 and the lubricating grease 21 which are in contact with the bearing bracket 20 are cooled.

As mentioned above, in the totally enclosed type driving electric motor in accordance with the present embodiment, it is possible to further improve the cooling performance of the bearing portion by providing the cooling fin 58 in the portion receiving the wind generated due to the rotation of the collar 57.

In this case, in the case that the wind generated due to the fan effect by the disc portion 57a is brought into contact with the end cover 22 and the frame 2, the cooling fan may be provided in the portion of the end cover 22 and the frame 2 with which the wind is brought into contact.

Eighth Embodiment

In the present embodiment, a description will be given of a modified embodiment of the collar described in the sixth and seventh embodiments mentioned above.

Figures 13, 14:
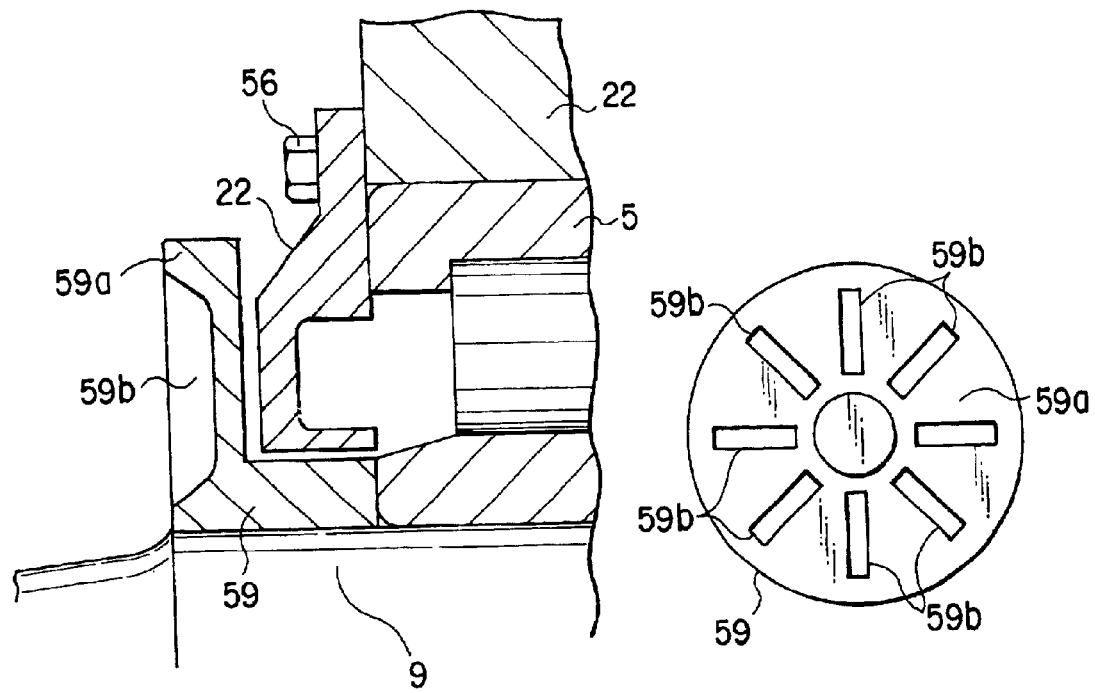
FIG. 13 is a cross sectional view exemplifying a peripheral structure of a collar arranged in a bearing bracket side and being in contact with the open air, among a totally enclosed type driving electric motor in accordance with an eighth embodiment of the present invention.
FIG. 14 is an outer appearance view obtained by seeing a collar being in contact with the open air in the bearing bracket side among the totally enclosed type driving electric motor in accordance with the eighth embodiment from a direction of a rotary axis of a shaft.

FIG. 13 is a cross sectional view exemplifying a peripheral structure of the collar arranged in the bearing bracket side and being in contact with the open air, among a totally enclosed type driving electric motor in accordance with the present embodiment. FIG. 13 is illustrated in the same state as that of the FIG. 10 described above.

Further, FIG. 14 is an outer appearance view obtained by seeing the collar being in contact with the open air in the bearing bracket side from a direction of a rotary axis of the shaft 9, among the totally enclosed type driving electric motor in accordance with the present embodiment.

Grooves 59b in a direction of the rotary axis are provided on a circular surface outside a disc portion 59a, in this collar 59. The grooves 59b of the collar 59 are mainly used for radiating heat and radiate the heat from the bearing 5 to the open air.

An area of the collar 59 being in contact with the open air is expanded by providing the grooves 59b as mentioned above, and a cooling performance near the bearing 5 is improved. Accordingly, it is possible to increase a lubricating service life of the lubricating grease 21, and it is possible to reduce a maintenance labor for replacement or the like.

Ninth Embodiment

In the present embodiment, a description will be given of a modified embodiment of the collar described in the sixth to eighth embodiments mentioned above.

Figure 15:
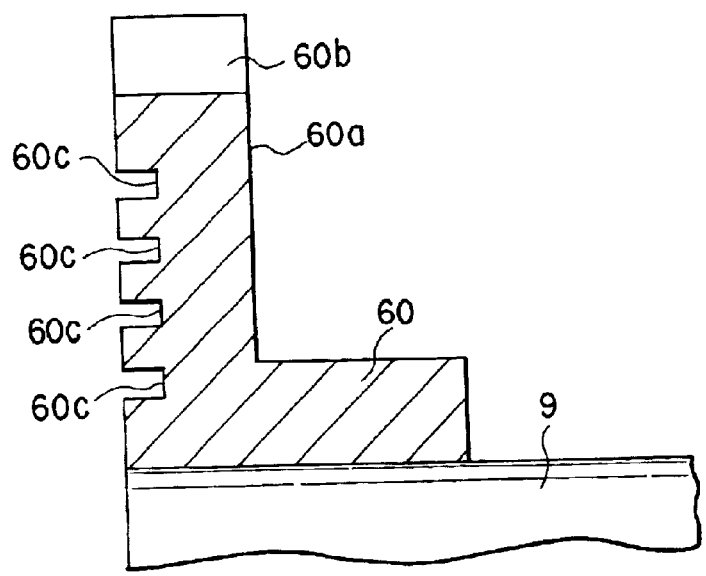
FIG. 15 is a cross sectional view exemplifying a structure of a collar arranged in a bearing bracket side and being in contact with the open air, among a totally enclosed type driving electric motor in accordance with a ninth embodiment of the present invention.

FIG. 15 is a cross sectional view exemplifying a collar arranged in the bearing bracket side and being in contact with the open air, among a totally enclosed type driving electric motor in accordance with the present embodiment. FIG. 15 is illustrated in the same state as that of FIG. 10 described above.

A groove 60b is formed in an outer peripheral portion of a disc portion 60a in a collar 60, in the same manner as that of the collar 57 in FIG. 10 described above. Accordingly, the disc portion 60a operates as a fan. Further, a plurality of circular grooves 60c are formed on an outer circular surface of the disc portion 60a of the collar 60 so as to have the same axis. The circular grooves 60c operate as a heat radiating fin.

Accordingly, in the totally enclosed type driving electric motor provided with the collar 60, it is possible to improve a cooling performance near the bearing 5, it is possible to extend a lubricating service life of the lubricating grease 21, and it is possible to reduce a maintenance labor for replacement or the like.

Tenth Embodiment

In the present embodiment, a description will be given of a totally enclosed type driving electric motor in which a fan is provided in a pressing plate provided in a bearing portion in an opposite drive side.

Figure 16:
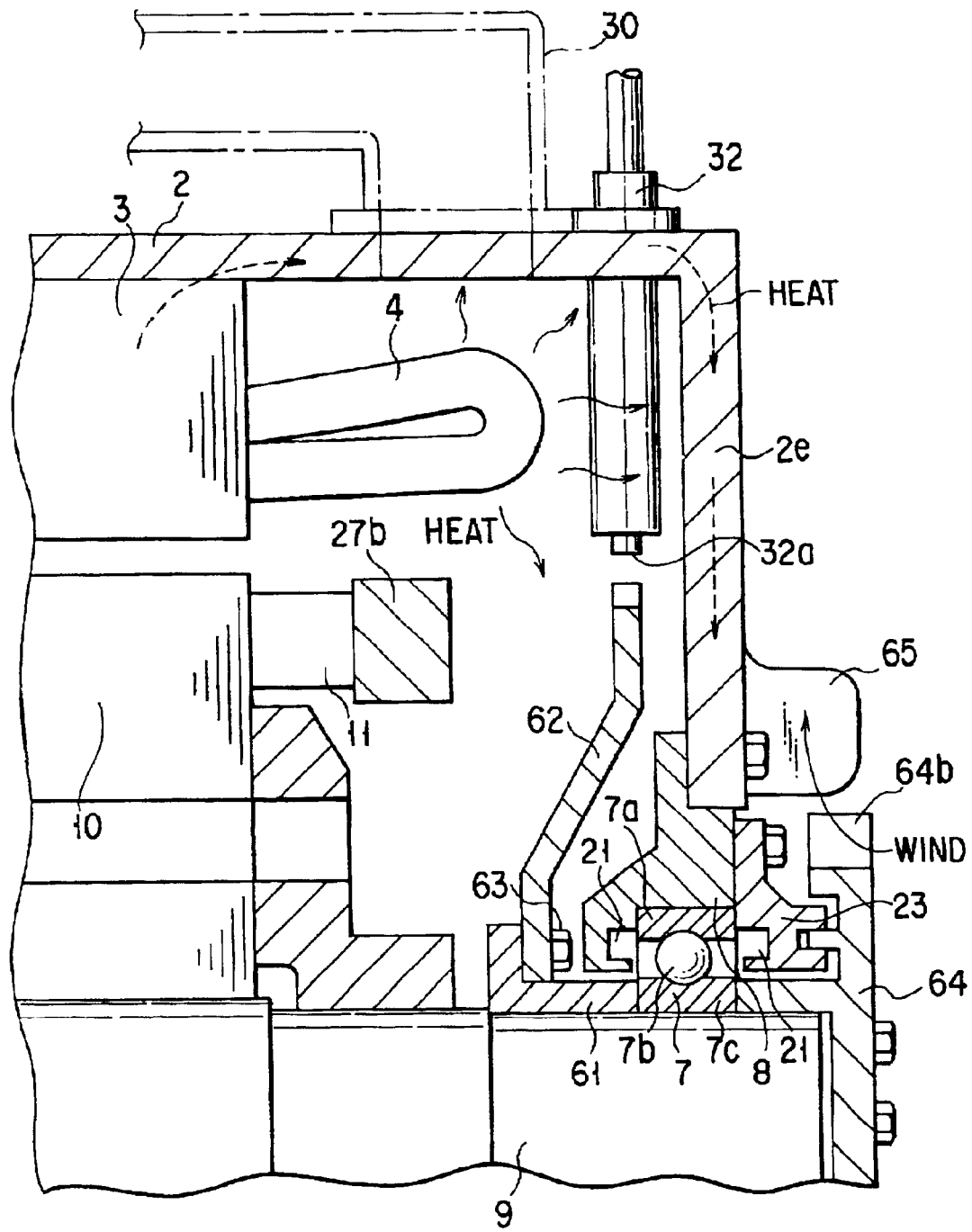
FIG. 16 is a cross sectional view exemplifying a peripheral structure of a bearing portion in an opposite drive side, among a totally enclosed type driving electric motor in accordance with a tenth embodiment of the present invention.

FIG. 16 is a cross sectional view exemplifying a peripheral structure of a bearing portion in an opposite drive side, among a totally enclosed type driving electric motor in accordance with the present embodiment. FIG. 16 is illustrated in the same state as that of FIG. 20 mentioned above.

In this case, with respect to the portions which are not illustrated in FIG. 16, for example, the same structure as that of the totally enclosed type driving electric motor 19 shown in FIG. 20 or the same structure as that of the totally enclosed type driving electric motor in accordance with each of the embodiments mentioned above may be employed.

In a totally enclosed type driving electric motor in accordance with the present embodiment, a sensor gear 62 is mounted to a collar 61 in an opposite drive side (in a housing 8 side), and fixed to a bolt 63. Further, the sensor 32 is mounted to the frame 2 so as to oppose to the sensor gear 62.

By employing the structure mentioned above, in the totally enclosed type driving electric motor in accordance with the present embodiment, the sensor 32 can be provided within the motor and it is possible to cancel the sensor case 25 shown in FIG. 20 described above. When the sensor case 25 is cancelled, a pressing plate 64 is in contact with the open air as shown in FIG. 16.

The pressing plate 64 being in contact with the inner wheel 7c of the bearing 7 has a cylindrical portion fitted to the shaft 9 so as to have the same axis.

Further, the pressing plate 64 is structured such that an outside outer peripheral portion is formed in a disc shape, a plurality of grooves 64b are worked in a circumferential portion and a fan structure is provided. Further, the pressing plate 64 rotates in accordance with the rotation of the shaft 9, and a cooling wind flows as shown by an arrow.

The wind generated due to the rotation of the pressing plate 64 is brought into contact with a plurality of cooling fins 65 mounted to the side plate 2e of the frame 2, and the heat transmitted from the frame 2 is radiated. Further, it is possible to prevent the temperature of the bearing 7 and the grease 21 existing around the bearing 7 from being increased. Further, it is possible to effectively radiate the heat of the bearing 7 to the open air by the pressing plate 64.

Accordingly, it is possible to improve the cooling performance of the bearing portion in the totally enclosed type driving electric motor and it is possible to restrict the temperature increase of the totally enclosed type driving electric motor. In particular, since the portion near the bearing 7 can be cooled, it is possible to extend a lubricating service life of the lubricating grease 21 and it is possible to reduce a maintenance labor for replacement or the like.

In this case, with respect to the pressing plate 64 provided in the totally enclosed type driving electric motor in accordance with the present embodiment, the various kinds of cooling structures which are the same as those of the collars described in the respective embodiments mentioned above can be applied, and various modifications can be applied.

Eleventh Embodiment

In the present embodiment, a description will be given of a modified embodiment of the totally enclosed type driving electric motor in accordance with the tenth embodiment mentioned above.

Figure 17:
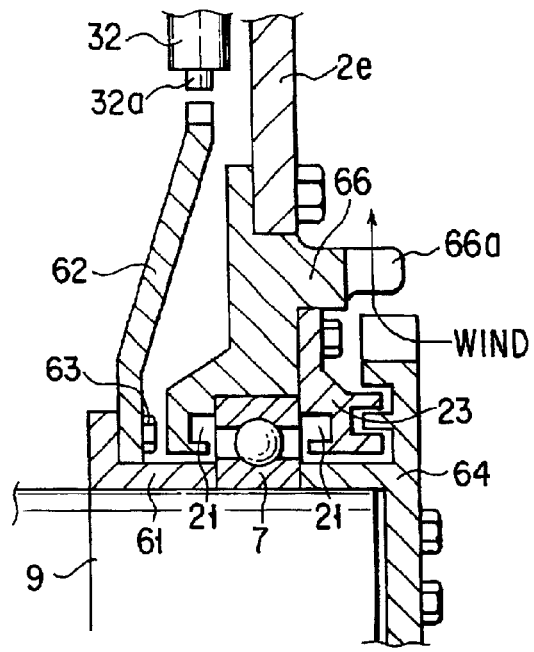
FIG. 17 is a cross sectional view exemplifying a peripheral structure of a bearing portion of an opposite drive side, among a totally enclosed type driving electric motor in accordance with an eleventh embodiment of the present invention.

FIG. 17 is a cross sectional view exemplifying a peripheral structure of a bearing portion in an opposite drive side, among a totally enclosed type driving electric motor in accordance with the present embodiment. FIG. 17 is illustrated in the same state as that of FIG. 16 describe above.

In the totally enclosed type driving electric motor in accordance with the present embodiment, a cooling fin 66a is formed in a housing 66. The structure is different from the totally enclosed type driving electric motor shown in FIG. 16 described above in a point that the cooling fin 66a receives the wind generated due to the rotation of the pressing plate 64.

In the totally enclosed type driving electric motor in accordance with the present embodiment, the temperature increase of the bearing 7 and the lubricating grease 21 is reduced by cooling the housing 66 in place of the frame 2.

In this case, in the present embodiment, the cooling fin 66a is mounted to the housing 66, however, for example, the cooling fin may be mounted to the end cover 23.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A totally enclosed type driving electric motor, comprising:

a shaft;

a cylindrical frame which surrounds the shaft;

a bearing bracket having a circular shape and attached to one end of the frame, the bearing bracket having a first hole through which the shaft passes and having the same axis as the shaft;

a housing having a circular shape and attached to another end of the frame, the housing having a second hole through which the shaft passes and having the same axis as the shaft;

a bearing which is located outside of a unit formed of the frame, the bearing bracket and the housing, and which rotatably supports the shaft;

a bearing support which is located outside of the unit and in an inner diameter portion of the bearing bracket, wherein the bearing support supports the bearing; and a rib which couples the bearing bracket to the bearing support, such that said bearing support, said bearing bracket and the rib provide a cooling space communicated to outside air.

2. A totally enclosed type driving electric motor according to claim 1, wherein said rib is provided with a cooling fin.

3. A totally enclosed type driving electric motor according to claim 1, further comprising:

a collar connected to the shaft providing a first labyrinth with said bearing support and a second labyrinth with said bearing bracket.

4. A totally enclosed type driving electric motor according to claim further comprising:

a collar connected to the shaft providing a first labyrinth with the bearing support; and a cap connected to the bearing bracket and providing a second labyrinth with the collar;

wherein the bearing support comprises a first groove and the cap comprises a second groove.

5. A totally enclosed type driving electric motor according to claim 1, further comprising a guide wind path, which guides air from said outside air into said cooling space.

6. A totally enclosed type driving electric motor, comprising:
- a shaft;
- a cylindrical frame which surrounds the shaft;
- a bearing bracket having a circular shape and attached to one end of the frame, the bearing bracket having a first hole through which the shaft passes and having the same axis as the shaft;
- a housing having a circular shape and attached to another end of the frame, the housing having a second hole through which the shaft passes and having the same axis as the shaft;
- a bearing which is located outside a unit formed of the frame, the bearing bracket and the housing, and which rotatably supports the shaft;
- a bearing support which is located outside the unit and in an inner diameter portion of the bearing bracket, wherein the bearing support supports the bearing, and
- a rib which couples the housing to the bearing support, such that said bearing support, said housing and the rib provide a cooling space communicated to outside air.

7. A totally enclosed type driving electric motor according to claim 6, wherein said rib is provided with a cooling fin.

8. A totally enclosed type driving electric motor according to claim 6, further comprising:
- a collar connected to the shaft providing a first labyrinth with said bearing support and a second labyrinth with said housing.

9. A totally enclosed type driving electric motor according to claim 6, further comprising:
- a collar connected to the shaft providing a first labyrinth with the bearing support; and
- a cap connected to the housing and providing a second labyrinth with the collar;
- wherein the bearing support comprises a first groove and the cap comprises a second groove.

10. A totally enclosed type driving electric motor according to claim 6, further comprising a guide wind path, which guides outside air from said outside air into said cooling space.

11. A totally enclosed type driving electric motor, comprising:
- a shaft;
- a cylindrical frame which surrounds the shaft;
- a bearing bracket having a circular shape and attached to one end of the frame, the bearing bracket having a first hole through which the shaft passes and having the same axis as the shaft;
- a housing having a circular shape and attached to another end of the frame, the housing having a second hole through which the shaft passes and having the same axis as the shaft;
- a bearing which is supported by the bearing bracket and which rotatably supports the shaft;
- a collar which is located outside of a unit formed of the frame, the bearing bracket and the housing, and which is connected to the bearing, the collar including a fan which radiates heat transmitted from the bearing through the collar to outside air.

12. A totally enclosed type driving electric motor according to claim 11, wherein said fan generates a wind by rotating, and said wind cools the bearing bracket.

13. A totally enclosed type driving electric motor according to claim wherein a part of the bearing bracket that receives said wind includes a cooling fin.

14. A totally enclosed type driving electric motor according to claim 11, wherein the collar includes a disc, which is concentric with the shaft and includes a groove.

15. A totally enclosed type driving electric motor, comprising:
- a shaft;
- a cylindrical frame which surrounds the shaft;
- a bearing bracket having a circular shape and attached to one end of the frame, the bearing bracket having a first hole through which the shaft passes and having the same axis as the shaft;
- a housing having a circular shape and attached to another end of the frame, the housing having a second hole through which the shaft passes and having the same axis as the shaft;
- a bearing which is supported by the housing and which rotatably supports the shaft;
- a pressing plate which is connected to said shaft, and which is located outside of a unit formed of the frame, the bearing bracket and the housing, and which is connected to the bearing, the pressing plate having a groove to allow heat transmission from the bearing to outside air.

16. A totally enclosed type driving electric motor according to claim 15, wherein said groove generates a wind by rotating, and said wind cools the frame or the housing.

17. A totally enclosed type driving electric motor according to claim 16, wherein a part of the frame or the housing that is exposed to said wind includes a cooling fin.

* * * * *

UNITED STATES PATENT AND TRADEMARK OFFICE
CERTIFICATE OF CORRECTION

PATENT NO. : 6,774,514 B2
DATED : August 10, 2004
INVENTOR(S) : Matsuoka et al.

It is certified that error appears in the above-identified patent and that said Letters Patent is hereby corrected as shown below:

<u>Title page,</u>
Item [75], Inventors, please change "Tokyo" to -- Tokorozawa --; and change "Yokohama" to -- Tokyo --.

<u>Column 20,</u>
Line 58, change "claim further" to -- claim 1, further --.

<u>Column 22,</u>
Line 17, change "claim wherein" to -- claim 12, wherein --

Signed and Sealed this

Thirtieth Day of November, 2004

JON W. DUDAS
*Director of the United States Patent and Trademark Office*